UNITED STATES PATENT OFFICE.

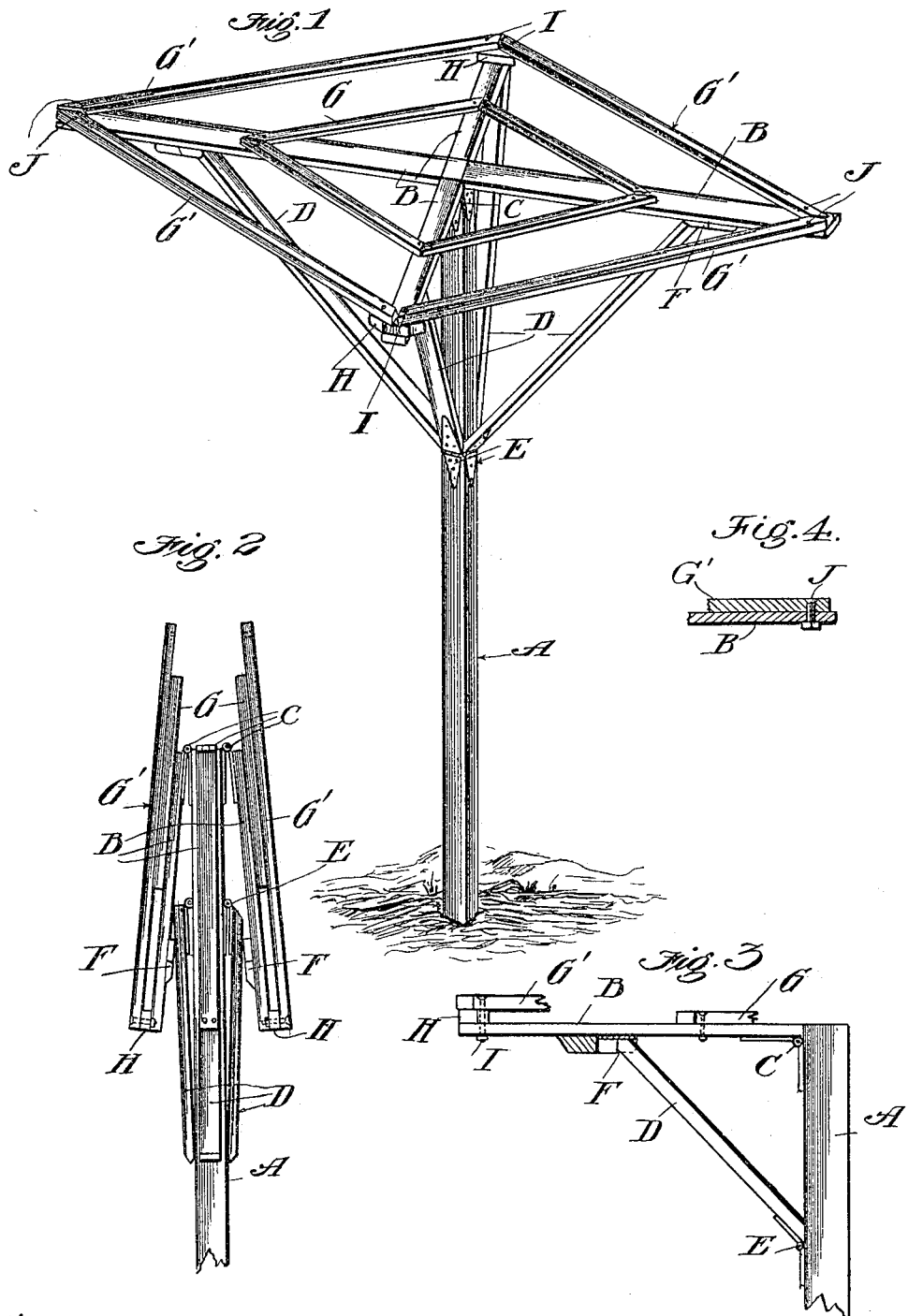

GEORGE H. BUCKINGHAM, OF LOS ANGELES, CALIFORNIA.

CHICKEN-ROOST.

No. 819,204.     Specification of Letters Patent.     Patented May 1, 1906.

Application filed May 22, 1905. Serial No. 261,678.

*To all whom it may concern:*

Be it known that I, GEORGE H. BUCKINGHAM, a citizen of the United States, residing at Los Angeles, in the county of Los Angeles and State of California, have invented a new and useful Chicken-Roost, of which the following is a specification.

The objects of my invention are to provide a handy and sanitary roost for poultry which can easily be put into a folded position and removed to any convenient situation for cleaning and can be easily replaced and put in position for use. I accomplish these objects by means of the device described herein and shown in the accompanying drawings, in which—

Figure 1 is a perspective view of my improved chicken-roost in place in the ground and in its spread-out position ready for use. Fig. 2 is an elevation thereof in its folded position, ready for transportation or for being cleaned. Fig. 3 is an enlarged detail of a portion thereof. Fig. 4 is a longitudinal section of a fragment of the projecting end of the supporting member B and the supports G, taken on a line where the bolt J, carried by the member G', penetrates the member B.

In the drawings, A is the main upright support of the frame, adapted for placement in the ground, as shown in the drawings, or it may be placed in sockets provided therefor in the frame of the chicken-house. On the upper end of the upright support I have placed four outwardly-projecting members B, hinged to the top of the support at C and held in a horizontal position by the supporting-struts D, hinged to the uprights at E and adapted to enter a socket F, provided for their reception in and under the projecting members B and hold the same in their horizontal position. These struts when it is desired to fold the roost up into the position shown in Fig. 2 are detached at their free ends from the outwardly-projecting members and are permitted to drop into the position as shown in Fig. 2. Detachably secured by bolts to the four projecting members B are the foot-supporting pieces G, upon which the chickens roost. In the drawings I have shown but two of the foot-rests extending around the central supporting-frame; but the number of these foot-rests will depend upon the size of the roost. The outside member G', being pivoted on the elevating-block H, gives these foot-rests a plane in which to be folded which is above the plane in which the inner foot-rests G move when being folded. The outer members G' are pivotally attached at one end to the outer ends of the members B, on the ends of which the elevating-blocks H are secured by means of bolts I, the free ends of the members G carrying downwardly-projecting bolts J, adapted to enter holes in the projecting ends of the members B, which do not carry the elevating-blocks H.

The roost when constructed as herein shown is transported to the place to be used in its folded position, and when the upright A is securely fastened either in the ground or in sprockets provided therefor the various members are placed in their spread-out position, as shown in Fig. 1, when the roost is ready for use.

It has been found by experience that it is impracticable to raise large quantities of chickens at one place, owing to the mites and various diseases which afflict the chickens—that they soon die off and are not healthy—and where it has been attempted poor success has attended the venture, and this owing to the disease and mites that afflict the chickens; but in a chicken-house provided with my portable chicken-roost the roosts are readily put into a folded position and thrown into a vat containing a solution of germicide and all the mites instantly destroyed, together with the various microbes which afflict chickens.

My portable roosts will permit the raising of large quantities of chickens in one place, owing to the facility of the attendant to keep the chickens free of mites and other microbes.

Having described my invention, what I claim as new, and desire to secure by Letters Patent, is—

1. The herein-described chicken-roost, comprising an upright support, a plurality of outwardly-extending members hinged to the top of the upright support and adapted to carry foot-rests, each member being provided on the under face thereof with a socket for the reception and engagement of supporting-struts; supporting-struts hinged to the supporting member at one end and adapted to enter the sockets in the projecting members and support the same; foot-rests for chickens hinged at one end to a horizontal member and being detachably engaged at the other end of an adjoining horizontal member.

2. The herein-described portable chicken-roost comprising the upright supporting member A; outwardly-projecting members B hinged at the top thereof and adapted to be supported by a strut pivotally secured to the supporting member, the strut D hinged to the upright and adapted to engage the outwardly-projecting member B; chicken foot-rests hinged on one end of an outwardly-projecting member and adapted to detachably engage the outer end of the adjoining outwardly-projecting member.

3. A chicken-roost arranged to be folded together for transportation or otherwise comprising an upright supporting member carrying on the top thereof hinged outwardly-projecting members; means to detachably support the outwardly-projecting members in a horizontal position, comprising supporting-struts hinged to the upright member and adapted to engage and support the upwardly-projecting member; foot-rests disposed above the outwardly-projecting members one end of each foot-rest being hinged to the outer end of one of the outwardly-projecting members and having means at the other end to detachably engage the outer end of the adjoining outwardly-projecting member.

In witness that I claim the foregoing I have hereunto subscribed my name this 13th day of May, 1905.

GEORGE H. BUCKINGHAM.

Witnesses:
HENRY T. HAZARD,
G. E. HARPHAM.